(12) United States Patent
Otto

(10) Patent No.: US 6,883,853 B2
(45) Date of Patent: Apr. 26, 2005

(54) ANCHORING DEVICE FOR A VEHICLE SEAT THAT CAN BE INSTALLED AND REMOVED WITHOUT THE USE OF TOOLS

(75) Inventor: Jürgen Otto, Burscheid (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/450,067

(22) PCT Filed: Dec. 7, 2001

(86) PCT No.: PCT/EP01/14362

§ 371 (c)(1),
(2), (4) Date: Nov. 17, 2003

(87) PCT Pub. No.: WO02/45994

PCT Pub. Date: Jun. 13, 2002

(65) Prior Publication Data

US 2004/0066055 A1 Apr. 8, 2004

(30) Foreign Application Priority Data

Dec. 7, 2000 (DE) .......................... 200 20 753

(51) Int. Cl.[7] .............................. B60N 2/02; B60N 2/06
(52) U.S. Cl. ................................ 296/65.03; 296/65.01; 296/65.13
(58) Field of Search .......................... 296/65.03, 65.01, 296/65.13, 63; 297/440.22

(56) References Cited

U.S. PATENT DOCUMENTS

| | | | | | |
|---|---|---|---|---|---|
| 3,385,628 | A | * | 5/1968 | Mandoza | 296/63 |
| 4,830,422 | A | * | 5/1989 | Levitre | 296/65.03 |
| 5,711,505 | A | * | 1/1998 | Nemoto | 248/424 |
| 6,036,252 | A | * | 3/2000 | Hecksel et al. | 296/65.03 |
| 6,220,665 | B1 | * | 4/2001 | Dingel et al. | 297/326 |
| 6,254,054 | B1 | * | 7/2001 | Few | 248/503.1 |
| 6,293,622 | B1 | * | 9/2001 | Horisawa | 297/344.1 |
| 6,357,814 | B1 | * | 3/2002 | Boisset et al. | 296/65.03 |
| 6,805,407 | B2 | * | 10/2004 | Iliscu | 297/331 |

* cited by examiner

Primary Examiner—D. Glenn Dayoan
Assistant Examiner—Greg Blankenship
(74) Attorney, Agent, or Firm—Foley & Lardner LLP

(57) ABSTRACT

An anchoring device for a seat that can be installed and removed inside a vehicle without the use of tools has at least one locking unit (2, 4) with a first functional part attached in stationary fashion to the vehicle, and a second functional part attached to the seat, the functional parts being constituted on the one hand by an undercut extension element (14) and on the other hand by a receiving part (16) having a locking receptacle (18), in such a way that for mounting, the seat can be inserted in a direction approximately perpendicular to a seat base plane (10) and is then displaceable parallel to the seat base plane (10) into a detent position. In the detent position, the extension element (14) sits in the locking receptacle (18) in a manner secured against perpendicular relative motions. For releasable retention of the functional parts in the detent position, the receiving part (16) has assigned to it a catch element (20, 22) which is pivotable about an axis (24, 26) that is generally perpendicular to the seat base plane (10) and has a retention segment (28) with which it fits around the extension element (14) in a retention position and retains it against rearward shifting out of the detent position. The catch element (20, 22) is joined to an actuation device (30), and configured in the region of the retention segment (28), in such a way that after perpendicular insertion, the seat is constrainedly displaceable by means of the actuation device (30) into the detent position, by the fact that the catch element (20, 22) grasps the extension element (14) and, upon pivoting, pulls the functional parts into the detent position.

12 Claims, 3 Drawing Sheets

ANCHORING DEVICE FOR A VEHICLE SEAT THAT CAN BE INSTALLED AND REMOVED WITHOUT THE USE OF TOOLS

The present invention concerns an anchoring device for a seat that can be installed and removed inside a vehicle without the use of tools, having at least one locking unit with a first functional part attached in stationary fashion to the vehicle, and a second functional part attached to the seat, the functional parts being constituted on the one hand by an undercut extension element configured in particular as a stud and on the other hand by a receiving part having a locking receptacle in particular in the form of a detent opening, in such a way that for mounting, the seat can be inserted in a direction approximately perpendicular to a seat base plane and is then displaceable parallel to the seat base plane into a detent position, such that in the detent position, the extension element sits (with positive rear engagement) in the locking receptacle in a manner secured against perpendicular relative motions; and for releasable retention of the extension element in the detent position, the receiving part has assigned to it a lever-like catch element which is pivotable about an axis that is in particular perpendicular to the seat base plane and has a hook-like retention segment with which it fits around the stud in a retention position and retains it against rearward shifting out of the detent position.

DE 196 28 382 A1 describes a quick-mounting apparatus of this kind for motor vehicle seats, in which undercut studs are arranged on the seat structure and can be inserted into chassis-mounted keyhole openings and then can be locked in a secured position that is displaced with respect to the insertion position. This locking is accomplished by way of a respective locking pawl that is preloaded by a spring and is mounted pivotably about a vertical axis on a chassis-mounted bearing element. The locking pawl is constituted by way of a control surface, for lateral pivoting by the impinging stud upon insertion into the secured position and for engagement behind the stud with a hook-shaped segment in the secured position.

This means that the entire seat, with the stud or studs, must be displaced into the secured position, i.e. until the respective locking pawl snaps into place behind the associated stud. This displacement of the entire seat is very difficult and cumbersome, especially in the case of multiple seats such as double or triple bench seats. Jamming thus often occurs as a result of uneven shifting on the two sides of the seat. For removal of the seat, the or each locking pawl is joined to an actuation bar with which it can be moved, against its spring force, into a released position so that the seat can then be displaced back into the insertion or removal position.

DE 38 31 101 C2 describes a similar seat attachment apparatus, mushroom-shaped studs being provided as floor-mounted components. The seat has, for each stud, a locking opening constituted in a plate. For retention in the installed position, what is provided here in each case is a bolt- or stud-like slider, guided in perpendicularly displaceable fashion, that snaps into place by spring force. Here again, the seat must therefore be displaced all the way into the locked position.

It is the object of the present invention to improve an anchoring device of the species as described so that it ensures greater utilization convenience in particular when installing (mounting) the seat.

According to the present invention, this is achieved by the fact that the catch element is joined to an actuation device, and configured in the region of the retention segment, in such a way that after perpendicular insertion, the seat is constrainedly displaceable by means of the actuation device into the detent position, by the fact that the catch element grasps the extension element and, upon pivoting, pulls the functional parts together into the detent position. Be it noted in this context that the motion described is a relative motion, and the extension element or the receiving part can be arranged in stationary fashion.

As a result of the configuration according to the present invention, it is advantageously no longer necessary for the entire seat to be directly manually displaced; instead, displacement is accomplished by means of the actuation device according to the present invention. The latter can advantageously be an economical and manually actuable lever arrangement. It is particularly advantageous in this context if at least two substantially identical locking units are arranged symmetrically on either side of a displacement center axis of the seat, and are joined to the same actuation device in such a way that they bring about a uniform displacement motion on both sides of the seat. Any jamming of the seat is thereby effectively prevented. Specific lever ratios within the lever arrangement can advantageously result in a force multiplication, thereby permitting the seat to be displaced without difficulty into the detent position even by weaker and less skilled persons.

All in all, the invention thus results in improved convenience upon installation of the seat.

Further advantageous embodiment features are contained in the dependent claims and in the description below.

The invention will be explained in more detail with reference to a preferred exemplary embodiment illustrated in the drawings, in which.

Figure 3:
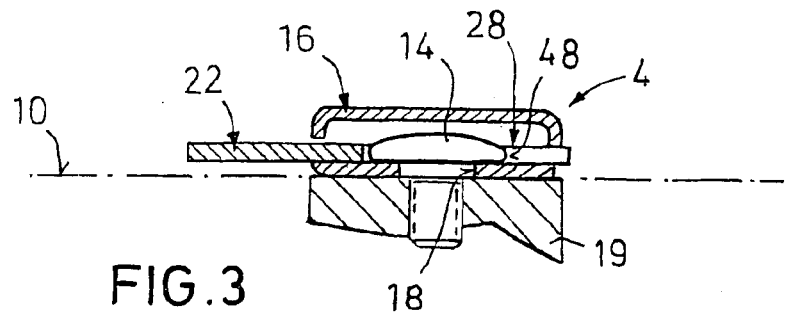
FIG. 3 is an enlarged cross section in plane III—III of FIG. 1 (see also plane III—III in FIG. 2)
Figures 4, 5:
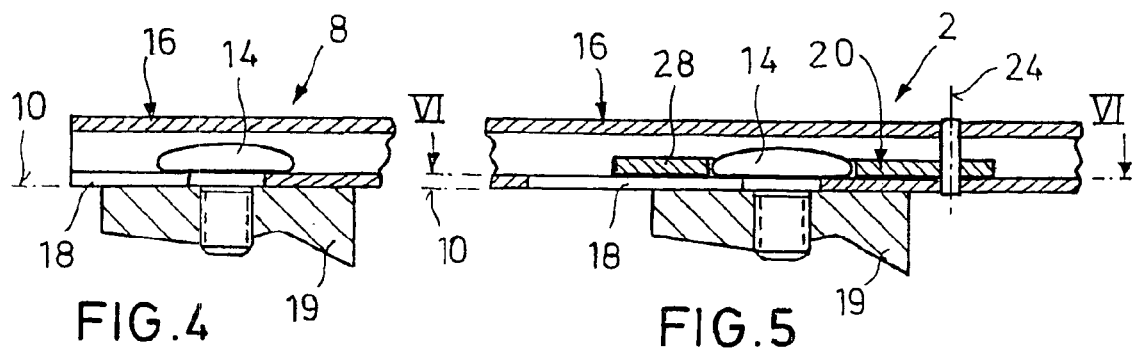
FIG. 4 is a section in plane IV—IV of FIG. 1 (see also FIG. 2)
FIG. 5 is a section in plane V—V of FIG. 1 (see FIG. 2)

In the preferred embodiment depicted, an anchoring device according to the present invention comprises two locking units 2, 4 and two additional anchors 6, 8. For mounting, the seat (not itself depicted) is first insertable (vertically) perpendicularly to a (horizontal) seat base plane 10 (cf. FIGS. 3 through 5), and can then be displaced in seat base plane 10 in the direction of a displacement center axis 12 into a detent position. Removal is accomplished, after unlocking, by way of a reversed sequence of motions. Locking units 2, 4 on the one hand and anchors 6, 8 on the other hand are each located approximately parallel to, and preferably symmetrically with respect to, one another on either side of displacement center axis 12.

Figure 6:
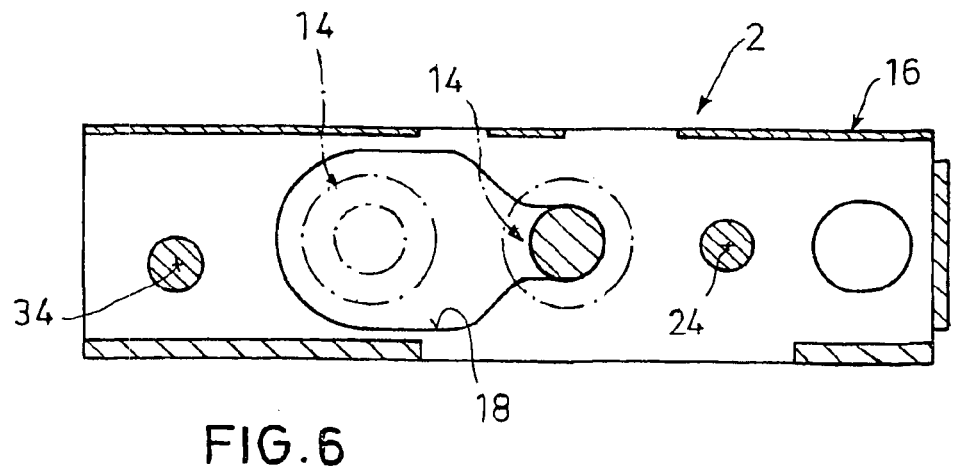
FIG. 6 is a section in plane VI—VI of FIG. 5.

Each locking unit 2, 4 and each anchor 6, 8 comprises a first functional part attached (in particular in stationary fashion) to the vehicle and a second functional part attached to the seat. In the preferred embodiment, each vehicle- or floor-mounted functional part is constituted by an extension element in the form of a stud 14 undercut in the shape of a mushroom, and the seat has in each case an associated receiving part 16 having a locking receptacle (detent opening 18). Receiving parts 16 are not depicted in FIG. 2. Studs 14 can be arranged directly on a vehicle floor or, as depicted, on e.g. parallelepipedal support parts 19. Receiving parts 16 are each configured as a hollow, elongated profiled element (retaining profile), for example as a bent sheet-metal part. Detent openings 18 can be keyhole-shaped (especially in the case of receiving parts 18 of first and second locking units 2, 4; see FIGS. 5 and 6) or slot-shaped with an open side (preferably in the case of receiving parts 18 of first and second anchors 6, 8; see FIGS. 1 and 4), and each have a widened insertion region for stud 14 and a narrowed detent region in which the respective stud 14 sits, in a detent position (see FIGS. 3, 4, and 5), with positive rear engagement and in manner secured against vertical motion.

For each locking unit 2, 4, receiving part 16 has assigned to it a respective lever-like catch element 20, 22 for releasable retention of stud 14 in the detent position. Each catch element 20, 22 is pivotable about a respective axis 24, 26 perpendicular to seat base plane 10, and comprises a hook-like retention segment 28 with which, in a retention position, it fits around the associated stud 14 and thus retains it against any backward displacement out of the detent position.

Anchors 6, 8 can be configured without any such displacement locking system.

According to the present invention, catch element 20, 22 is joined to an actuation device 30, and configured in the region of its retention segment 28, in such a way that after vertical insertion the seat is constrainedly displaceable by means of actuation device 30 into the detent position, by the fact that catch element 20, 22 grasps the associated stud 14 and, upon pivoting, pulls it into the detent position.

Figure 1:
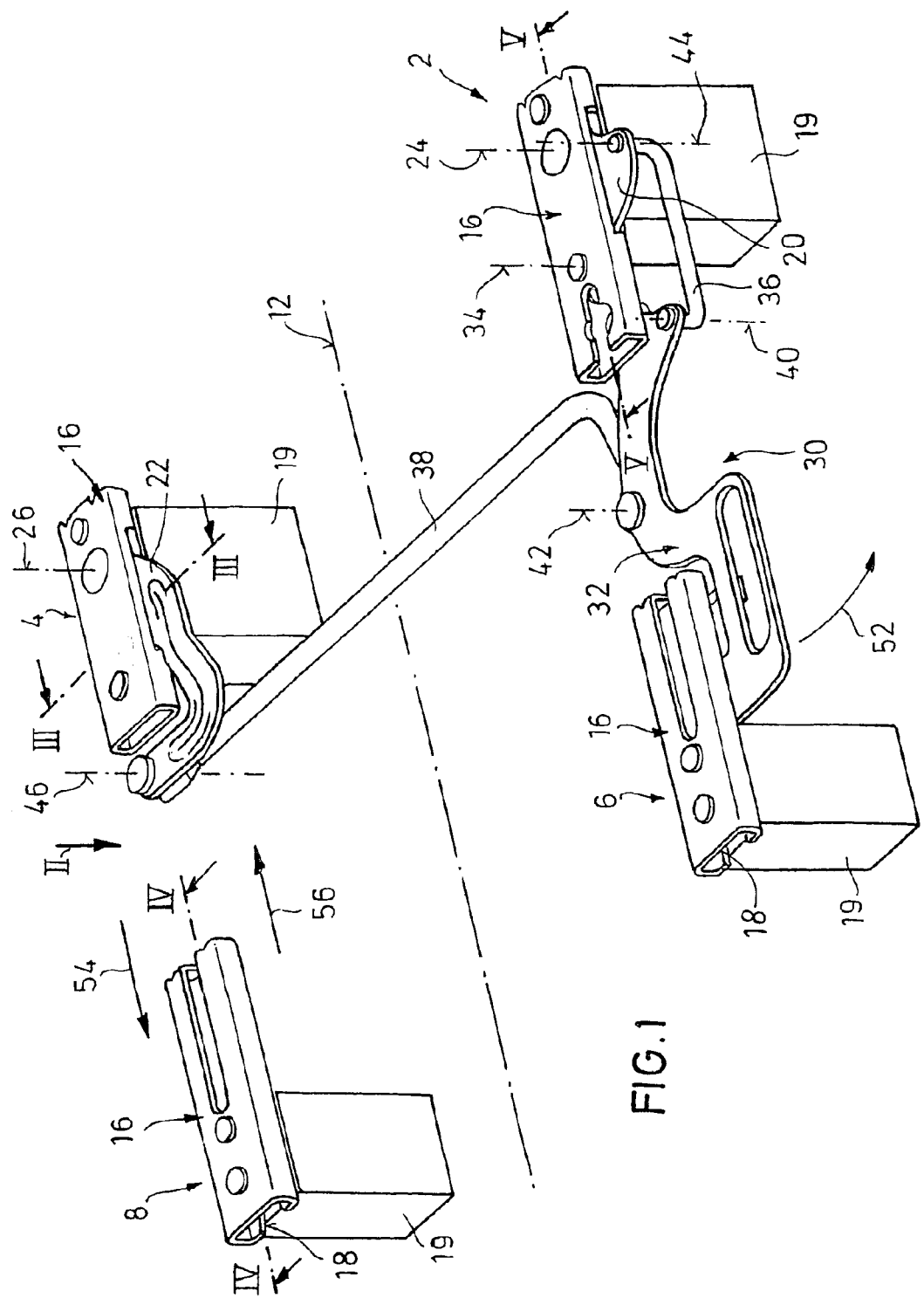
FIG. 1 is a perspective view of the essential components of an anchoring device according to the present invention for a seat (not itself depicted)
Figure 2:
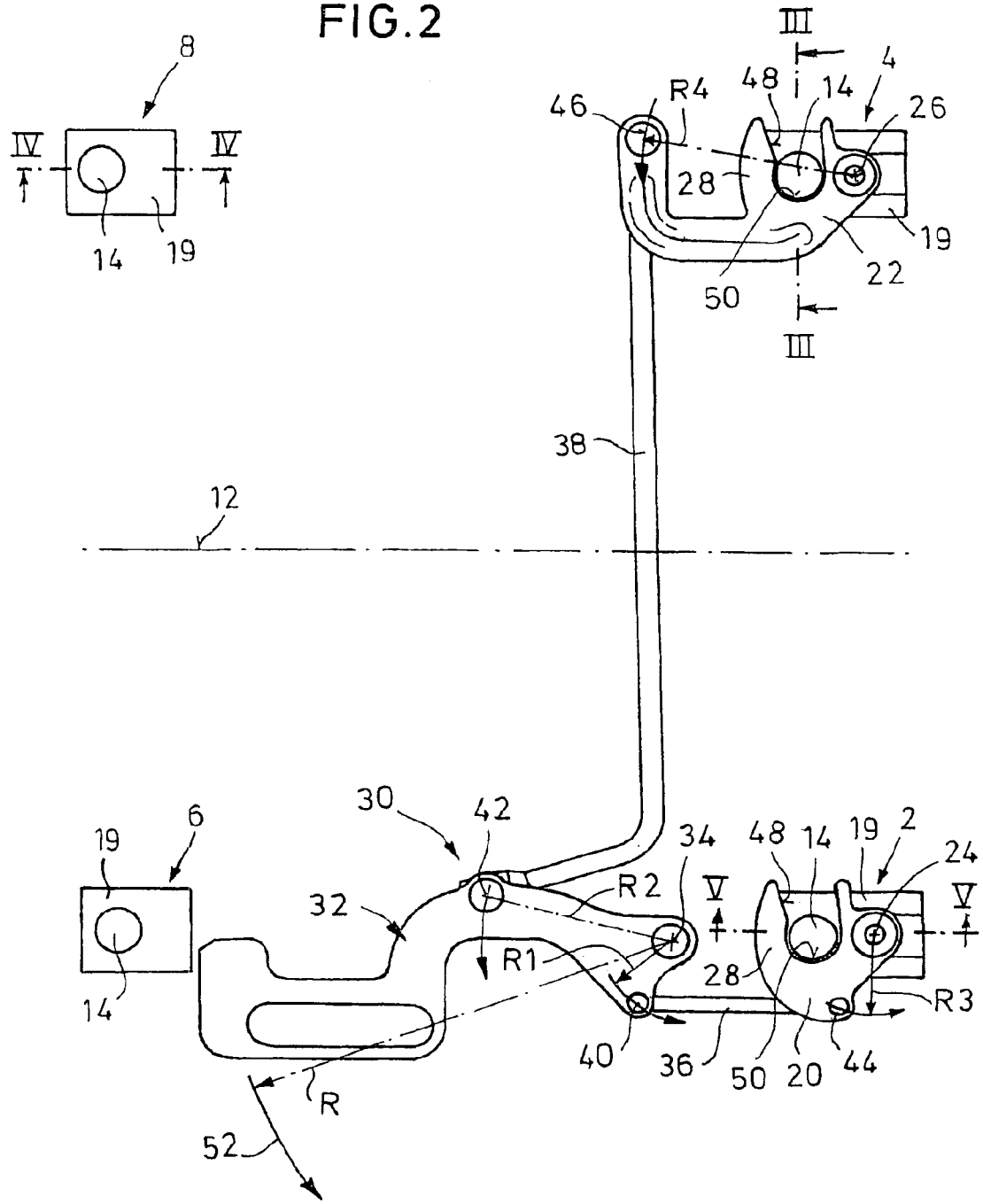
FIG. 2 is a plan view in the direction of arrow 11 in FIG. 1, the receiving parts having been omitted.

As shown in FIGS. 1 and 2, actuation device 30 is embodied as a lever arrangement having a manually actuable hand lever 32. Said hand lever 32 is joined, in particular, to receiving part 16 of first locking unit 2, pivotably about a pivot axis 34 that is perpendicular to seat base plane 10 (see FIG. 1). Hand lever 32 is joined on the one hand articulatedly via a first connecting element 36 to first catch element 20 of first locking unit 2, and on the other hand articulatedly via a second connecting element 38 to second catch element 22 of second locking unit 4. Connecting elements 36, 38 are each constituted by a bar or the like in order to be able to transfer tensile and compressive forces; the bars may have curves or angles (e.g. 38) so they can be accommodated on and guided in the seat without collisions. Hand lever 32 is joined to first connecting element 36 via a first pivot axis 40 and to second connecting element 38 via a second pivot axis 42. On its other side, first connecting element 36 is joined to first catch element 20 via a third pivot axis 44, and second connecting element 38 to second catch element 22 via a fourth pivot axis 46. First pivot axis 40 lies on a first pivot radius R1 and second pivot axis 42 on a second pivot radius R2, referring in each case to pivot axis 34 of hand lever 32. In addition, third pivot axis 44 lies on a third pivot radius R3 and fourth pivot axis 46 on a fourth pivot radius R4, referring to pivot axes 24 and 26, respectively, of the respective catch elements 20 and 22. A fundamental provision made here is that the size ratio of first pivot radius R1 to second pivot radius R2 is equal to the ratio of third pivot radius R3 to fourth pivot radius R4, i.e. R1:R2=R3:R4. The advantageous result of this is that the displacement motions are the same on both sides. This is advantageously the case even if first pivot radius R1 is not equal to second pivot radius R2. This is advantageous in terms of accommodating the components in the region of the seat chassis. Hand lever 32 is configured to be larger, in terms of its overall lever length and the lever radius R resulting therefrom, than the two pivot radii R1 and R2 of first and second pivot axes 40, 42. This results in a force multiplication which makes possible smooth actuation for displacement of the seat. In order to allow studs 14 to be grasped with catch elements 20, 22 starting from a perpendicularly inserted intermediate position of the seat, each catch element 20, 22 comprises, proceeding from its hook-like retention segment 28, a capture edge 48 which extends obliquely in such a way that upon pivoting of catch element 20, 22, the respective stud 14 is slidingly pulled into the detent position by capture edge 48. Be it noted here that each catch element 20, 22 coacts with the enlarged head of stud 14 (see FIGS. 3 and 5).

As shown in FIG. 2, each catch element 20, 22 has an approximately U-shaped receiving opening 50 adapted to the head of stud 14 in such a way that in the detent position, stud 14 is held in coaction with detent opening 18 with at least approximately zero clearance.

The operation of the anchoring device according to the present invention will now be explained with reference to FIG. 1. For installation of the seat, the latter is placed with receiving parts 16 vertically onto studs 14 (in the direction of arrow 11), so that studs 14 engage into the widened regions of detent openings 18, actuation device 30 being in a released position in which hand lever 32 is pivoted outward in arrow direction 52. After placement of the seat, a motion of hand lever 32 out of said released position inward and opposite to arrow direction 52 is accomplished, thereby displacing the seat in arrow direction 54 into the detent position, in which studs 14 sit, positively engaged in the vertical direction, in the narrowed regions of detent openings 18. In this position, catch elements 20, 22 also effect retention against backward displacement. This backward displacement in arrow direction 56 for removal of the seat is not possible until hand lever 32 has been pivoted outward in arrow direction 52, so that catch elements 20, 22 release studs 14. Lastly, the seat can once again be removed vertically upward.

In a further preferred embodiment of the invention, provision is made for hand lever 32 to be easily and ergonomically graspable in the side region of the seat, and in particular to be arranged between the seat and an adjacent vehicle door in such a way that a pivoting motion in arrow direction 52 into its unlocked position is possible only when the vehicle door is open. This feature represents an important safety aspect, since unlocking of the seat while driving, i.e. with the vehicle door closed, is ruled out.

The lever arrangement constituting actuation device 30 is designed in such a way that only small actuation forces are needed to overcome friction upon displacement of the seat. The anchoring device is advantageously of very flat configuration and can therefore be constructed as a separate module that, if necessary, can be introduced even into confined spaces. The positions of the attachment points (studs) in the vehicle can be coordinated so that the seat can be installed selectably with or without the module.

The invention is not limited to the preferred exemplary embodiment depicted, but rather encompasses all embodiments that are functionally identical within the meaning of the invention. In particular, let it be mentioned once again that a "kinematic reversal" in which the functional parts are arranged "in reverse"—i.e. with studs 14 on the seat and receiving parts 16 on the vehicle—also lies within the context of the invention. In addition, the invention is also hitherto not yet limited to the combination of features defined in claim 1, but rather can also be defined by any other combination of specific features of the totality of all disclosed individual features. This means that fundamentally, practically any individual feature of claim 1 can be omitted or replaced by at least one individual feature disclosed elsewhere in the application. To that extent, claim 1 is to be understood as merely a first attempt at stating an invention.

What is claimed is:

1. An anchoring device for a seat that can be installed and removed inside a vehicle without the use of tools, having at least one locking unit (2, 4) with a first functional part attached to the vehicle, and a second functional part attached to the seat, the functional parts being constituted on the one hand by an undercut extension element (14) and on the other hand by a receiving part (16) having a locking receptacle (18), in such a way that for mounting, the seat can be inserted in a direction approximately perpendicular to a seat base plane (10) and is then displaceable parallel to the seat base plane (10) into a detent position, such that in the detent position, the extension element (14) sits in the locking receptacle (18) in a manner secured against perpendicular relative motions; and for releasable retention of the functional parts in the detent position, the receiving part (16) includes a catch element (20, 22) which is pivotable about an axis (24, 26) that is in particular perpendicular to the seat base plane (10) and has a retention segment (28) with which it fits around the extension element (14) in a retention position and retains it against rearward shifting out of the detent position, wherein the catch element (20, 22) is joined to an actuation device (30), and configured in the region of the retention segment (28), in such a way that after perpendicular insertion, the seat is constrainedly displaceable by means of the actuation device (30) into the detent position, by the fact that the catch element (20, 22) grasps the extension element (14) and, upon pivoting, pulls the functional parts into the detent position.

2. The anchoring device as defined in claim 1, wherein two substantially identical locking units (2, 4) are arranged on either side of a displacement center axis (12) of the seat, and are joined to the same actuation device (30) in such a way that they bring about a uniform displacement motion on both sides of the seat.

3. The anchoring device as defined in claim 2, wherein the actuation device (30) is configured as a lever arrangement having a hand lever (32) pivotable about a pivot axis (34) that is perpendicular to the seat base plane (10), the hand lever (32) being joined on the one hand articulatedly via a first connecting element (36) to the first catch element (20) of the first locking unit (2), and on the other hand articulatedly via a second connecting element (38) to the second catch element (22) of the second locking unit (4).

4. The anchoring device as defined in claim 3, wherein the hand lever (32) is joined to the first connecting element (36) via a first pivot axis (40) and to the second connecting element (38) via a second pivot axis (42), the first pivot axis (40) lying on a first pivot radius (R1) and the second pivot axis (42) on a second pivot radius (R2), referring in each case to the pivot axis (34) of the hand lever (32).

5. The anchoring device as defined in claim 4, wherein the first connecting element (36) is joined to the first catch element (20) via a third pivot axis (44), and the second connecting element (38) to the second catch element (22) via a fourth pivot axis (46), the third pivot axis (44) lying on a third pivot radius (R3) and the fourth pivot axis (46) on a fourth pivot radius (R4), referring to the pivot axes (24, 26) of the respective catch elements (20, 22).

6. The anchoring device as defined in claim 5, wherein the size ratio of the first to the second pivot radius (R1:R2) is equal to the ratio of the third to the fourth pivot radius (R3:R4).

7. The anchoring device as defined in claim 6, wherein the hand lever (32) is configured to be larger, in terms of its overall lever length and the lever radius (R) resulting therefrom, than the two pivot radii (R1, R2) of the first and second pivot axes (40, 42).

8. The anchoring device as defined claim 1, wherein each catch element (20, 22) comprises, proceeding from its hook-like retention segment (28), a capture edge (48) which extends obliquely in such a way that upon pivoting of the catch element (20, 22), the extension element (14) is slidingly pulled into the detent position by the capture edge (48).

9. The anchoring device as defined in claim 8, wherein each catch element (20, 22) has a generally U-shaped receiving opening (50) adapted to the extension element (14) in such a way that in the detent position, the extension element (14) sits in the detent opening (18) with approximately zero clearance.

10. The anchoring device as defined in claim 2, further including two additional anchors (6, 8) which are offset forward or backward in the displacement direction relative to the locking units (2, 4) and on either side of the displacement center axis (12), said anchors (6, 8) each comprising an extension element (14) and a receiving part (16) in the manner of the locking unit (2/4), selectably with or without a catch element.

11. The anchoring device as defined in claim 1, wherein the extension element (14) constitutes the functional part attached to the vehicle, and the receiving part (16) with the locking receptacle (18) and optionally the catch element (20,22) and the actuation device (30) constitute the functional parts attached to the seat.

12. The anchoring device as defined in one of claim 3, wherein the hand lever (32) is arranged in the lateral region of the seat between it and a vehicle door in such a way that a pivoting motion into its unlocked position for removal of the seat is possible only when the vehicle door is open.

* * * * *